United States Patent
Noll et al.

(10) Patent No.: US 9,889,361 B2
(45) Date of Patent: Feb. 13, 2018

(54) IMPACT SENSITIVE SPORTS REBOUND WALL

(71) Applicants: WALLJAM LIMITED, Stevenage (GB); IEE International Electronics & Engineering S.A., Luxembourg (LU)

(72) Inventors: Alain Noll, Luxembourg (LU); Alexander Treis, Luxembourg (LU); Julian Cox, Essex (GB); Tim Worboys, Stevenage (GB)

(73) Assignees: WALLJAM LIMITED, Stevenage (GB); IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 14/770,869

(22) PCT Filed: Feb. 28, 2014

(86) PCT No.: PCT/GB2014/050594
§ 371 (c)(1),
(2) Date: Aug. 27, 2015

(87) PCT Pub. No.: WO2014/132071
PCT Pub. Date: Sep. 4, 2014

(65) Prior Publication Data
US 2016/0001154 A1    Jan. 7, 2016

(30) Foreign Application Priority Data
Mar. 1, 2013   (GB) .................................. 1303715.5

(51) Int. Cl.
*A63B 69/00* (2006.01)
*A63B 69/36* (2006.01)
(Continued)

(52) U.S. Cl.
CPC .......... *A63B 69/0097* (2013.01); *A63B 24/00* (2013.01); *F41J 5/04* (2013.01);
(Continued)

(58) Field of Classification Search
CPC ... A63B 69/0097; A63B 63/00; A63B 63/004; A63B 69/3658; A63B 69/0002
(Continued)

(56) References Cited

U.S. PATENT DOCUMENTS 4,534,557 A * 8/1985 Bigelow ................. A63B 43/00
                                                                  473/438
4,915,384 A * 4/1990 Bear .................... A63B 24/0021
                                                                  473/451
(Continued)

FOREIGN PATENT DOCUMENTS

DE          29617783 U1 *  2/1998    ......... A63B 24/0021
EP           1184059 A1 *  3/2002    ......... A63B 24/0021
(Continued)

OTHER PUBLICATIONS

International Search Report for Application No. PCT/GB2014/050594, dated Apr. 30, 2014.

*Primary Examiner* — Mitra Aryanpour
(74) *Attorney, Agent, or Firm* — Kilyk & Bowersox, P.L.L.C.

(57) ABSTRACT

A sports rebound wall is provided that includes: a rebound surface, at least one target area formed in the rebound surface, and a resistive matrix sensor formed on, or embedded in, the target area. The matrix sensor includes a first array of substantially parallel conductive tracks and a second array of substantially parallel conductive tracks. The first array and the second array are spaced apart from one another. The rebound wall has a matrix sensor that is capable of providing information about the force, location and (Continued)

timing at which the target area of the sports rebound wall is impacted. This is made possible by the specific construction of the matrix sensor.

13 Claims, 2 Drawing Sheets

(51) Int. Cl.
*A63B 24/00* (2006.01)
*F41J 5/04* (2006.01)
*F41J 5/20* (2006.01)
*G06F 3/044* (2006.01)
*G06F 3/047* (2006.01)
*G09B 19/00* (2006.01)
*A63B 71/06* (2006.01)

(52) U.S. Cl.
CPC ............. *F41J 5/20* (2013.01); *G06F 3/044* (2013.01); *G06F 3/047* (2013.01); *G09B 19/0038* (2013.01); *A63B 71/0622* (2013.01); *A63B 2024/004* (2013.01); *A63B 2024/0043* (2013.01); *A63B 2208/0204* (2013.01); *A63B 2220/13* (2013.01); *A63B 2220/53* (2013.01); *A63B 2220/62* (2013.01); *A63B 2220/801* (2013.01); *G06F 2203/04112* (2013.01)

(58) Field of Classification Search
USPC ....... 473/435, 422, 434, 454–464, 150, 152, 473/156; 73/493, 488; D21/721, 698, D21/699, 780; 356/28; 273/371, 374, 273/377
See application file for complete search history.

(56) References Cited

U.S. PATENT DOCUMENTS

| | | | | |
|---|---|---|---|---|
| 5,419,565 A * | 5/1995 | Gordon | ................. | A63B 63/00 473/455 |
| 5,685,789 A * | 11/1997 | Murphy | ............. | A63B 24/0021 473/478 |
| 5,779,241 A * | 7/1998 | D'Costa | ............ | A63B 24/0021 473/194 |
| 5,820,496 A * | 10/1998 | Bergeron | ............... | A63B 63/00 473/455 |
| 6,551,205 B1* | 4/2003 | Koelzer, Jr. | ............. | A63B 63/00 473/454 |
| 6,837,495 B2* | 1/2005 | Gerson | ................... | F41J 5/056 473/476 |
| D509,872 S * | 9/2005 | Alberti | ........................ | D21/699 |
| 7,179,179 B2* | 2/2007 | McDaniel | ............ | A63B 63/003 473/422 |
| 7,247,105 B2* | 7/2007 | Huntsberger | ....... | A63B 24/0021 473/433 |
| 7,805,276 B1* | 9/2010 | Byers | ..................... | A63B 63/00 473/454 |
| 8,001,838 B2* | 8/2011 | Roberts | .............. | A63B 69/0002 473/455 |
| 8,098,154 B2* | 1/2012 | Young | ...................... | G01S 5/02 340/539.1 |
| 8,109,845 B2* | 2/2012 | Duty | .................. | A63B 24/0021 473/446 |
| 8,292,709 B2* | 10/2012 | Welch | ................ | A63B 24/0021 273/317.6 |
| 8,356,818 B2* | 1/2013 | Mraz | ........................ | F41J 5/041 273/348 |
| D680,600 S * | 4/2013 | Piot | .............................. | D21/699 |
| 8,414,408 B2* | 4/2013 | Nicora | ............... | A63B 69/3658 473/154 |
| D702,779 S * | 4/2014 | Piot | .............................. | D21/699 |
| 8,771,107 B1* | 7/2014 | Ayala | ................. | A63B 69/0002 473/422 |
| 8,834,284 B2* | 9/2014 | Nicora | ............... | A63B 69/3658 473/154 |
| D731,013 S * | 6/2015 | Jackowiak | .................... | D21/699 |
| 9,220,967 B2* | 12/2015 | Kaleel | .................... | A63B 69/38 473/459 |
| 2002/0052255 A1* | 5/2002 | Trevino | ............. | A63B 69/0002 473/455 |
| 2003/0047001 A1* | 3/2003 | Liao | ................... | A63B 24/0021 73/493 |
| 2010/0289507 A1* | 11/2010 | Joguet | .................... | G06F 3/044 324/686 |
| 2011/0086733 A1* | 4/2011 | Duty | .................. | A63B 24/0021 473/478 |
| 2016/0001154 A1* | 1/2016 | Noll | ................... | A63B 69/0097 473/435 |

FOREIGN PATENT DOCUMENTS

| | | | | |
|---|---|---|---|---|
| EP | 2363181 A1 * | 9/2011 | .......... | A63B 69/002 |
| FR | 2956820 A1 * | 9/2011 | .......... | A63B 69/002 |
| FR | 3006198 A1 * | 12/2014 | ............. | A63B 63/00 |
| FR | 3009970 A1 * | 3/2015 | ......... | A63B 69/0097 |
| GB | 2337820 A * | 1/1999 | ............. | A63B 63/00 |
| GB | 2425600 A * | 11/2006 | ............. | A63B 24/0021 |
| GB | 2514130 A * | 11/2014 | ............. | A63B 63/00 |
| GB | 2511361 B * | 5/2015 | ......... | A63B 69/0097 |
| WO | 03011404 A2 | 2/2003 | | |
| WO | WO 03011404 A2 * | 9/2003 | ............. | A63B 3/004 |
| WO | WO 2013123938 A1 * | 8/2013 | ......... | A63B 24/0021 |

* cited by examiner

IMPACT SENSITIVE SPORTS REBOUND WALL

FIELD

The present invention relates to sports rebound walls. In particular, the present invention provides a sports rebound wall that has a rebound surface containing target areas and wherein those target areas contain matrix sensors that are able to detect when they are impacted by a projectile. Additionally, the matrix sensors allow the rebound wall to detect the force of any impacts of the target areas as well as the location of the centre of the impact.

BACKGROUND

A generation ago it was commonplace for children to play outside. Amongst other activities, this play often included playing with a ball against a vertical wall surface such as the wall of a garage or of a house, or a garden wall. This allowed children to develop ball control skills and generally increase coordination and fitness. Sadly outdoor recreation amongst children is on the decline, due in part to current more limited land availability and in part to the greater attraction of computer games, which are heavily promoted and advertised and keep children off the streets. One result is that the present generation of young children has much less exposure to the skill development routines of, for example, hitting or kicking a ball against a wall.

GB2466012 discloses a sports training aid that consists of a freestanding sports rebound wall that is designed to be used for ball control sports. The wall is designed to be used where land availability is scarce and comprised a non-planar rebound surface having a variable coefficient of restitution between different parts of the rebound surface. The training aid is formed from a rigid backing structure clad with a non-planar rebound surface. The preferred method of constructing the sports training aid of GB2466012 is a concrete base supporting a tubular metal framework on which rigid backing panels are mounted, the backing panels being covered with a rebound cladding. Although this construction is modular and relatively simple, the use of a concrete base and tubular metal framework results in a construction that is heavy and can not be easily deconstructed and moved to another location when desired. Later sports rebound walls have a lighter modular construction that allows them to be easily constructed and transported and that overcome the problems of GB2466012.

Many previously proposed sports rebound wall, including the sports training aid of GB2466012 comprise force sensors that are located on the surface of, or within, the rebound wall such that when an object impacts the wall the impact is sensed. The sensors may simply sense that an object has impacted the wall. Alternatively, the sensors may sense the position and/or force at which the wall has been impacted. The wall may have any number of force sensors. The force sensors may be evenly spread over the surface of the wall or they may be located in specific target locations. However, little or no technical details of the force sensors are disclosed, instead these walls are intended to use force sensors that were already well known to the person skilled in the art. There was no disclosure of bespoke force sensors designed for sports rebound walls.

These previously proposed sports rebound walls also disclose outputting the force sensors to a suitable computer system to provide feedback to a user or to a third party supervising the use of the training aid. This feedback may be in the form of collected data or may be integrated with other features to provide an interactive experience for a user. They also disclose providing a graphical display, such as an LED or video screen that can be integrated with the force sensors to provide a user with an interactive experience, for example to show information to a user related to the output of the force sensors.

Previously proposed sports rebound walls also disclose the use of a computer or other similar means for controlling the force sensors and any graphical displays. The computer or other similar means may be able to be programmed to provide alternative modes of operation and may be able to monitor and store information and data provided by any interactive feature of the sports training aid. Suitable software, firmware or hardware for controlling the use of the interactive features may be provided. Information stored by a computer or similar means may be used by a user or supervisor to provide feedback about their use of the sports training aid.

In light of the above there is a need for a sports rebound wall comprising a force sensor that is capable of the above functions. The force sensor should be robust and preferably able to detect location, force and timing of any impacts.

SUMMARY

The present invention provides a sports rebound wall comprising:

a rebound surface at least one target area formed in the rebound surface a resistive matrix sensor formed on, or embedded in, the target area; wherein the matrix sensor consists of a first array of substantially parallel conductive tracks and a second array of substantially parallel conductive tracks and the first array and the second array are spaced apart from one another The present invention is advantageous in that it provides a robust and specifically designed force sensor (the matrix sensor) that is capable of providing information about the force, location and timing at which a target area of the sports rebound wall is impacted. Furthermore, a single sensor can provide information over a complete target area. There is no need for multiple sensors for each target area.

The resistive matrix sensors of the present invention work in a somewhat similar manner as other resistive matrix sensors, for example those found in resistive touch screens. That is, the sensor consists of a first array of substantially parallel conductive tracks that are linked to one another and cover a defined planar area and a second array of substantially parallel conductive tracks that are linked to one another and cover the same planar area. The first array and the second array cover the same planar area such that an impact at any point over that area can be detected. Both the first array and the second array form a single conductive circuit with a first end and a second end. The arrays are spaced apart from one another by a small distance in a direction perpendicular to the planar area.

When in use, an electrical current is passed through the first array and the second array. The total resistance of the first array and the second array from the first end to the second end is known. When the matrix sensor is impacted the first array will be forced into contact with the second array due to the force of the impact. This will result in the first array and the second array being short-circuited over the area of the contact. In effect this results in four new circuits:

The first end of the first array to a first end of the impact;

The second end of the first array to a second end of the impact;

The first end of the second array to a third end of the impact; and

The second end of the second array to a fourth end of the impact.

Each of these new circuits will have a measurable resistance that is less than the known resistance of the relevant array. By measuring the ratio of the resistance of each of the four new circuits to the known resistances of the first and second arrays it is possible to accurately calculate the following six distances:

The length of the tracks of the first array from the first end of the first array to the first end of the impact;

The length of the tracks of the first array from the first end of the impact to the second end of the impact;

The length of the tracks of the first array from the second end of the impact to the second end of the array;

The length of the tracks of the second array from the first end of the second array to the third end of the impact;

The length of the tracks of the second array from the third end of the impact to the fourth end of the impact; and The length of the tracks of the second array from the fourth end of the impact array to the second end of the array.

Knowing these six distances allows a number of related parameters to be calculated. In particular, it allows the centre of the impact and, if it is assumed that the impact is substantially elliptical, the size of the impact to be calculated. Furthermore, if the projectile that caused the impact is known, it is possible to calculate the force of the impact from the (maximum) size of the impact. In this manner, the output of a resistive matrix sensor of the present invention can be used to calculate the accuracy and force of an impact. Furthermore, the duration of an impact can be sensed from the time at which the first array contacts the second to the time when the first array no longer contacts the second array. In some applications this duration may additionally be used to calculate the force of an impact. The specific time of an impact (i.e. the time at which the impact occurred) can be determined in an obvious manner. Knowing these parameters allows an almost infinite number of sports training applications and games to be implemented by a rebound wall according to the present invention.

The sports training applications and games implemented by a rebound wall can be configured not just by sport but by ability of user, age of user, the projectile type to be used by the wall, the distance from the wall at which the user is intended to stand and any other parameter that would be apparent to the person skilled in the art. The applications and games can be implemented through specific design of the sports rebound wall and its components and/or by appropriately controlling or calibrating the interactive elements of the sports rebound wall, such as the matrix sensors.

For any specific embodiment of the present invention a suitable form for the tracks of the first and second array will be able to be determined by the skilled person. The tracks may have any suitable shape and the calculation of the six lengths and the related parameters may be varied accordingly. For example, the tracks of the first and second array may form a single long contiguous spiral. However, in preferred embodiments of the invention it is anticipated that the tracks of the first and second arrays will comprise substantially linear and parallel lengths that are joined to an adjacent track at each of their ends to form a single long track. This is preferable as an array formed in this manner will be able to measure the length of an impact in a direction normal to the direction in which the linear tracks extend and the resolution of this measurement will be equal to twice the spacing between adjacent tracks.

In order for a matrix sensor with arrays of substantially linear and parallel tracks to function properly it is necessary that the first array is positioned relative to the second array such that the tracks of the first array are not parallel to the tracks of the second array. Any other orientation of the first array relative to the second array will allow the sensor to function properly. However, in order for the sensor to operate ideally it is preferable that the sensor is formed such that the tracks of the first array are substantially normal to the tracks of the second array.

The matrix sensors of the present invention may be substantially any shape, they may be square, rectangular, irregular in shape or any other shape. There is no limitation on the potential size of a matrix sensor of the present invention. However, in preferred embodiments of the invention the matrix sensors will be elliptical and even more preferably will be circular.

The construction of the matrix sensors of the present invention allows relatively large sensors to be constructed. In preferred embodiments of the invention the matrix sensors may be 650 mm (25.59 inches) across or larger (e.g. if circular a matrix sensor may have a diameter of 650 mm (25.59 inches) or greater). However, it is to be understood that is substantially no limit to the upper or lower size of a matrix sensor according to the present invention.

A sports rebound wall according to the present invention may have any number of target areas and associated matrix sensors. The specific location of the target areas is discussed below. Preferably each matrix sensor will be substantially the same size and shape as an associated target area such that there is one matrix sensor for each target area. However, in alternative embodiments of the invention each target area may comprise two or more matrix sensors. This may be preferred if a target area is particularly large or if standard sized matrix sensors are used to create a larger target area. If two or more matrix sensors are used for a single target area it is preferable that these matrix sensors are positioned such that they do not overlap. However, there is no technical reason why overlapping matrix sensors can not be used and certain embodiments of this invention may utilise overlapping matrix sensors.

The conductive tracks of a matrix sensor according to the present invention may be formed of any appropriate material. However, purely as example, the conductive tracks may be substantially formed of aluminium.

The at least one target area of the present invention may have substantially any shape and be positioned substantially anywhere on the rebound surface. The preferred location of the target areas may be dependent upon the sport for which the rebound wall is being used or intended to be used for the. For example if the rebound wall is intended for or being used for football training the target areas may be preferably located in the corners of a representative goal area. This will encourage a user to try and hit the corners of the goal area with a football when using the rebound wall. Alternatively or additionally, if the rebound wall is intended for or being used for tennis training the target areas may be preferably located in positions where an ideal tennis serve would pass over a tennis net, an graphical representation of the tennis net may be provided on the rebound surface. Further equivalent or alternative locations that are suitable for training for football, tennis or any other sport will be immediately apparent to a person skilled in the art.

The skilled person will appreciate that target areas of a sports rebound wall according to the present invention may be of substantially any size, shape or sensitivity. The specific size, shape and sensitivity of the target areas of any specific sports rebound wall will be dependent upon the specific intended use of the wall. For example, a wall intended for football training may have target areas that are substantially circular and those target areas may have a moderate sensitivity. Alternatively, a wall intended for tennis training may have rectilinear target areas, perhaps positioned at the location of an ideal tennis shot, and those target areas may have a high sensitivity. The sensitivity of a target area may be controlled through the specific construction of the matrix sensor and/or by computer calibration and/or by the thickness of any facing layer positioned in front of the sensor and/or by any other means apparent to a person skilled in the art.

In embodiments of the invention the at least one target, and any matrix sensor embedded therein, will be circular in shape. This may be preferred as it will allow a user to aim for a specific point on the rebound surface, preferably the centre of the target area, yet for an impact with the target area to still be measured by the matrix sensor if they miss the specific point by less than a set distance i.e. the radius of the target area. However, in some circumstances a circular target area will not be preferred. For example, if the target is intended to be the corner of a football goal it may be preferred that the target area is a 90° section of a circle as this will accurately represent the area in which the user could hit a ball and still score a goal. Similarly, if the target area is located and intended for practicing tennis serves then it may be preferable that the target area is rectangular as this could accurately represent the area in which the user could hit a ball and still get the ball over a tennis net and have a valid serve. Other possible shapes of target areas that are suitable for specific sports will be apparent to a person skilled in the art.

As will be discussed below, the output of the matrix sensors may be logged by a computer. As a matrix sensors according to the present invention is capable of sensing the location of the centre of an impact anywhere over its area then, in certain embodiments of the invention, it may be possible to alter the active area of the matrix sensor using the computer. That is, the computer could be set up such that it only logs impacts on the matrix sensor that are within a particular timeframe, within a particular surface region of the target area or that are within a particular force limitation (i.e. above a minimum force and/or below a maximum force). In this way the specific functionality of the rebound wall can be controlled by an appropriate computer. As an example, as discussed above it may be preferable that when a rebound wall is used for tennis training that the properly located target areas are a 180° section of a circle. Rather, than providing a target area of this physical shape, a computer may be used to control a target area of any other shape such that only impacts within the appropriate 180° section of a circle are logged. Other implementations of this computer control include but are not limited to counting how many times a target area has been impacted within a specific timeframe, measuring how many times a target area has been hit with a projectile that is travelling above a specific speed (the speed of a projectile being directly related to the force at which it impacts the wall) and many other possible training "games".

A target area may have a corresponding a graphical indication of the centre and/or the edge of the target area and/or any other indication of the physical shape of the target area shown on the rebound surface. This can allow a user to properly target the target areas with a projectile when the rebound wall is in use.

The target areas and the resistive sensor of the present invention may be of substantially any size, subject to the manufacturing constraints of the resistive sensors. In preferred embodiments of the invention the target area may be circular and have a diameter of at least 650 mm (25.59 inches) or, if the target area is of any other shape, to have a longest dimension of at least 650 mm (25.59 inches) (e.g. the diagonal of a square or rectangular target area). This is much larger than was possible with a single sensor in rebound walls according to the prior art. In previous rebound walls it was necessary to use multiple sensors to produce a target area of this size. However, it is now possible to create target areas of this size in the present invention using a single sensor. This is a result of the specific construction of the matrix sensors that are used as the force sensors.

Any matrix sensors of the present invention may be formed at the surface of the rebound surface. However, in order to protect them from impact, it may be preferable that the matrix sensor(s) are positioned behind a protective impact layer that is formed on the surface of the rebound wall. The protective impact layer may be formed of any suitable material. Preferably, the impact layer will be formed of a material that will be able to withstand repeated impacts from projectiles such as footballs, tennis balls or any other sports ball. Suitable materials include rubber, foam polyurethane etc.

Additionally, it is preferable that a protective impact layer is thin enough to transmit the force of an impact to any matrix sensor located beneath. To this end, the thickness and material properties of a protective impact layer may be determined by the intended sport for which the wall is intended to be used. For example, if the projectile of the relevant sport is relatively hard (e.g. a cricket ball or hockey ball) the protective impact layer may preferably be relatively thick and/or may be formed of a material that can absorb the energy of an impact in order to prevent the matrix sensor being damaged and to reduce the likelihood of a projectile rebounding off the wall back on to a user or onto a bystander. Conversely, if the projectile of the relevant sport is relatively soft or light it may be necessary to have a relatively thinner protective impact layer and/or an impact layer formed of a material that absorbs less of the impact energy.

Taking into account the above considerations, very generally a protective impact layer of a sports rebound wall may preferably have a thickness of between 1 mm (0.04 inch) and 20 mm (0.79 inch). If a matrix sensor is located behind a protective impact layer it may be preferable that any computer logging the output of the force sensors is suitably calibrated to take into account the proportion of force of an impact that will be absorbed by the impact layer. It is anticipated that the skilled person will be able to do this without difficulty.

A sports rebound wall according to the present invention will generally be substantially vertical (or up to 15 degrees removed therefrom) and used for training for ball sports such as football, basketball tennis, hockey and other similar sports. However, other embodiments of the present invention are also possible. For example, the wall may be substantially horizontal and used for cricket training in place of the cricket wicket in order for bowlers to train to pitch the ball on or near a target area. Rebound walls may be formed for use in martial arts training where it is the user, rather than a projectile, that impacts the wall.

A sports training aid may comprise one or more rebound walls according to the present invention. For example, the rebound walls may form the front and back face of a training aid. Additionally or alternatively, rebound walls may also form side walls of a training aid.

The present invention also provides a method of sports training using the sports rebound wall described above. In particular, the present invention provides a method of sports training comprising:

providing a sports rebound wall according to the present invention;

providing a suitable projectile for propelling against the at least one target area of the rebound surface of the rebound using the resistive matrix sensor to detect the location, force and timing of impacts of the projectile upon the at least one target area and providing appropriate feedback.

The method of the present invention is the preferred mode of operation of the rebound wall described above. However, alternative methods of operating the rebound wall described above may also be possible. Importantly, the method of the present invention comprises the steps of providing a suitable projectile and using the resistive matrix sensor to detect the location, force and timing of the impacts of said projectile. This is important as, in order to provide appropriate information of the force of an impact, it is necessary to know the specific projectile that caused that impact. This is because, as discussed above, the matrix sensors of the rebound wall calculate the force of an impact from the size of the impact area. Different projectiles impacting the rebound wall with the same force will produce different impact areas on the matrix sensors. For example, a football will necessarily produce a bigger impact area than a tennis ball that is propelled with the same force. Therefore, it is necessary that when the rebound wall is being used that a suitable projectile is used. If the rebound wall is intended for football training a football will be the suitable projectile, if the rebound wall is intended for tennis training a tennis ball will be the suitable projectile etc.

However, as discussed below, it may be possible for the output of the matrix sensors of a single rebound wall to be suitably processed after use to provide the correct output for a number of projectiles. If the output is only to be used for subsequent analysis, the raw data from the output of the matrix sensors may simply be subsequently adjusted to take into account the specific projectile used. However, if the output of the matrix sensors is used for immediate feedback, for example on a graphical display, it is important that either the correct and suitable projectile is used or the rebound wall is set up for the particular projectile that is going to be used before the sports training begins.

The step of providing the appropriate feedback of the method of the present invention will preferably involve the use of a computer or other similar means for receiving the raw output data of the matrix sensor(s), transforming that data to provide an indication of the timing, location and force of every impact of a projectile upon a target area of the rebound wall and logging that transformed data for subsequent analysis and/or providing immediate feedback on a visual display and/or through an audio output and/or by any other suitable means. The correct transformation of the raw data by the computer will be immediately apparent to a person skilled in the art, depending on the provision and use of a suitable projectile. However, even if a different projectile is used, as discussed above, it may be possible to further transform the data after use of the rebound wall in order to correct for the use of the different projectile. For example, if a tennis ball was used and the data is transformed on the basis that a football was being used it will be relatively straightforward to subsequently correct the transformed data on the basis that a tennis ball was used.

A computer for use with the method of the present invention may be integrally formed with the rebound wall. That is the rebound wall of the present invention may comprise a computer or other data processing means. Alternatively or additionally, raw or transformed data from the rebound wall may be transmitted to a remote processing means, such as an internet server, and be processed remotely from the rebound wall. For example, a rebound wall according to the present invention may comprise wired or wireless data transmission means. This data transmission means can then upload the data to a suitable location for transformation, feedback and possible later analysis. If this is done it may allow data from many training sessions and/or many different rebound walls and/or many different users may be compared, contrasted and analysed. In particular, this can allow users using different rebound walls to compete against one another, even from different locations. This also allows a user to configure their training session to themselves on the basis of any suitable variable including, but not limited to, age, height, previous performance, weight, disability.

As mentioned above, instant feedback may be provided on a visual display. The visual display may comprise any suitable means including a video screen and/or a simple digital display. Any suitable visual feedback may be displayed including but not limited to the number of impacts detected, the force of the last impact, the maximum force of any impact during the session, the distance of the last impact from the centre of the target area, the target area that was last hit. The visual feedback may be controlled by a computer or other processing means that is integrated with the rebound wall or may be controlled by a remote computer or other processing means, such as those discussed above. The visual feedback is preferably instant. If the visual feedback is instant and is controlled remotely this can allow a user to directly compete against a remote user training with a different rebound wall as well as competing against previous users of the same wall and previous users of other walls carrying out the same, or similar, training session. This can be done in any manner that is apparent to a person skilled in the art.

Additionally or alternatively, instant feedback may be provided by audio means, such as through speakers. Audio feedback may be implemented and controlled in substantially the same manner as the visual feedback discussed immediately above.

The rebound wall of the present invention may be operated such that only one target area is activated at any one time and an impact on any other target area will not be registered. This can be done in order to create suitable training games and scenarios. The activation and deactivation of individual target sensors can be achieve in any manner apparent to a person skilled in the art. A sports rebound wall that is capable of being operated in this manner may comprise visual indicators, such as an LED light, located in or near the target areas or located to illuminate the target areas when the target areas are activated.

Further features and advantages of the present invention will be apparent from the preferred embodiment of the invention that is shown in the Figures and is illustrated in the drawings.

DETAILED DESCRIPTION

Figure 1:
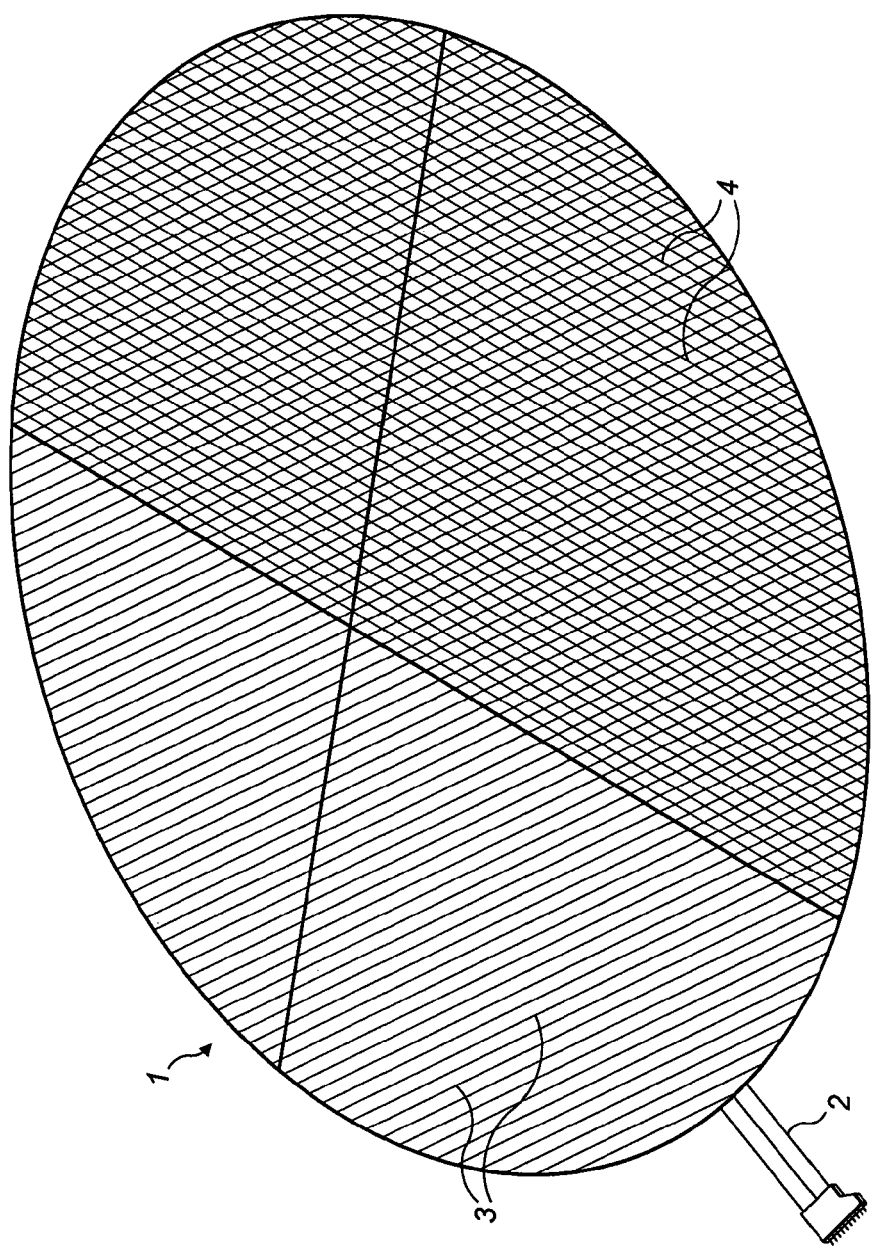
FIG. 1 is a schematic diagram of a matrix sensor of the sports rebound wall according to an embodiment of the present invention.

A resistive matrix sensor 1 of a sports rebound wall according to the present invention is shown in FIG. 1. The matrix sensor 1 is substantially circular and has a mounting lead 2 extending from an outer edge. The sensor 1 consists of a first array of substantially parallel conductive tracks 3 that are linked to one another and a second array of substantially parallel conductive tracks 4 that are linked to one another. The first and second array 3, 4 are at angles to one another and each cover substantially all of the surface area of the circular sensor 1. For clarity the second array 4 is only shown on the right half of the sensor 1. However, it is to be understood that the second array 4 extends over the entire surface of the sensor 1. Additionally, as FIG. 1 is only a schematic drawing the spacing of the tracks of each array 3, 4 is not accurately depicted. It is to be understood that in an actual sensor 1 the tracks of each array 3, 4 will be evenly spaced across the surface of the sensor 1. The first and second array 3, 4 are spaced apart from one another by a small distance in a direction perpendicular to the surface of the sensor 1.

When in use, the sensor 1 will be connected to an external power source and controlling means by means of the mounting lead 2. The operation of the sensor 1 is set out in detail above so is not repeated here. In summary, the construction of the sensor 1 allows it to detect the force and location of an impact anywhere over its surface.

Figure 2:
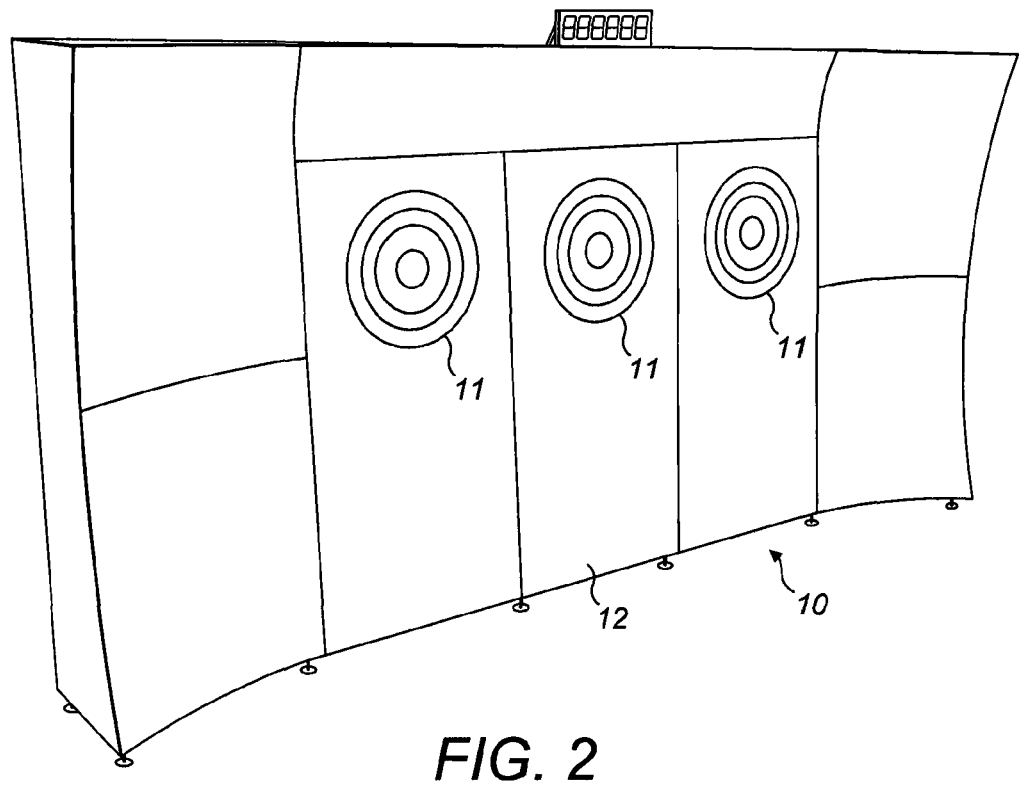
FIG. 2 is a schematic diagram of a sports rebound wall according to the present invention.
Figure 3:
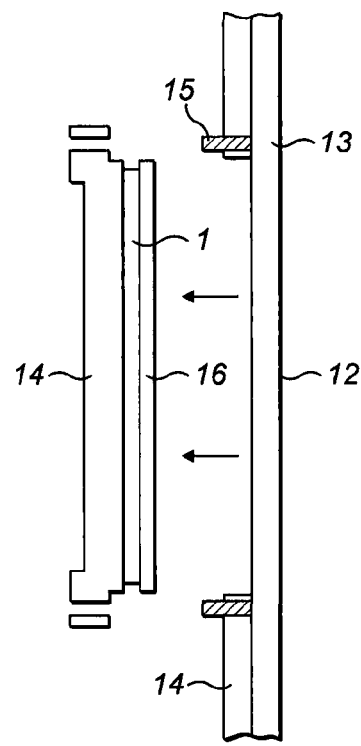
FIG. 3 is a schematic drawing showing the mounting of the sensor of FIG. 1 in the sports rebound wall of FIG. 2.

A sports rebound wall 10 according to the present invention is shown in FIG. 2. The rebound wall 10 is substantially vertical and has three sensors 1 embedded within target areas 11 of its rebound surface 12. The manner in which the sensors 1 are mounted in the sports rebound wall 10 is shown in FIG. 3. Although substantially vertical, as shown in FIG. 2, the rebound surface 12 of the wall 10 is curved away from vertical at its upper and outer ends. This is to allow a ball that impacts the wall 10 on these areas to be returned to a position that is closer to a user than would happen if the rebound surface 12 were entirely flat and vertical.

The rebound surface 12 of the wall 10 is formed of glass reinforced plastic (GRP) 14 and is covered with a layer of rubber matting 13. The matting 13 protects the surface 12 from damage when impacted with a ball or any other projectile and is decorated to indicate the target areas 11. The sensors 1 are mounted in the wall 10 from behind in the manner shown in FIG. 3. In particular, the sensors 1 are mounted behind the rubber matting 13 but in front of removable panels that are formed in the GRP 14 and held in position by securing features 15. In order to further protect the sensors 1 a layer of low density foam 16 is positioned in front of the sensor 1 and behind the rubber matting 13. The removable panels allow the sensors 1 to be easily accessed and replaced when necessary. The panels are formed such that the mounting lead 2 of each sensor 1 can be easily attached to the power source and controlling means of the rebound wall 10.

When the rebound wall 10 is in use a user will try to hit the target areas 11 with a ball, for example a football or tennis ball. When a target area 11 is hit the sensor 1 embedded in that target area will detect the impact and will provide output that is indicative of the location at which the target area 11 was impacted and the force of the impact. This output may be utilised in any of the manners discussed above or in any other manner that would be apparent to a person skilled in the art.

What is claimed is:

1. A sports rebound wall comprising:
   a wall having a rebound surface, the rebound surface being formed of glass reinforced plastic covered with a layer of rubber matting;
   at least one target area formed in the rebound surface;
   a resistive matrix sensor formed on, or embedded in, the target area;
   wherein the matrix sensor consists of a first array of substantially parallel conductive tracks and a second array of substantially parallel conductive tracks and the first array and the second array are spaced apart from one another.

2. A sports rebound wall according to claim 1, wherein the tracks of the first and second arrays are substantially linear and the tracks of the first array are not parallel with the tracks of the second array.

3. A sports rebound wall according to claim 1, wherein the tracks of the first array and the second array are normal to one another.

4. A sports rebound wall according to claim 1, wherein the at least one target area is circular.

5. A sports rebound wall according to claim 4, wherein the at least one target area is at least 650 mm (25.59 inches) in diameter.

6. A sports rebound wall according to claim 1, having a plurality of target areas.

7. A sports rebound wall according to claim 1, wherein the resistive matrix sensor is substantially circular.

8. A sports rebound wall according to claim 1, further comprising removable panels formed in the glass reinforced plastic.

9. A sports rebound wall according to claim 8, wherein the resistive matrix sensor is mounted behind the rubber matting and in front of the removal panels.

10. A sports rebound wall according to claim 1, further comprising a layer of low density foam positioned in front of the resistive matrix sensor and behind the rubber matting.

11. A method of sports training comprising:
    providing a sports rebound wall according to claim 1;
    providing a suitable projectile for propelling against the at least one target area of the rebound surface of the sports rebound wall;
    using the resistive matrix sensor to detect the location, force and timing of impacts of the projectile upon the at least one target area; and
    providing appropriate feedback.

12. A method according to claim 11, wherein the feedback is logged on an appropriate computer for subsequent analysis.

13. A method according to claim 11, wherein the feedback is immediately provided on a visual display.

* * * * *